United States Patent
Tsukagoshi et al.

(10) Patent No.: US 7,545,723 B2
(45) Date of Patent: Jun. 9, 2009

(54) HOLOGRAPHIC RECORDING MEDIUM, METHOD FOR MANUFACTURING THE SAME, AND HOLOGRAPHIC RECORDING-REPRODUCING SYSTEM

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 433 days.

(21) Appl. No.: 10/569,208

(22) PCT Filed: Aug. 20, 2004

(86) PCT No.: PCT/JP2004/011976

§ 371 (c)(1),
(2), (4) Date: Feb. 23, 2006

(87) PCT Pub. No.: WO2005/022518

PCT Pub. Date: Mar. 10, 2005

(65) Prior Publication Data

US 2006/0280095 A1    Dec. 14, 2006

(30) Foreign Application Priority Data

Aug. 28, 2003    (JP)    ............................ 2003-304125

(51) Int. Cl.
*G11B 7/24*    (2006.01)
*G03H 1/00*    (2006.01)

(52) U.S. Cl. ...................... 369/103; 369/275.3; 369/286

(58) Field of Classification Search ................. 369/103, 369/112.1, 112.03, 275.3, 275.4, 284, 112.08, 369/286; 359/3, 7, 35, 30, 494; 428/64.1, 428/64.4; 430/270.11
See application file for complete search history.

(56) References Cited

U.S. PATENT DOCUMENTS

| | | | |
|---|---|---|---|
| 6,540,397 B2 * | 4/2003 | Yoshinari et al. | 369/275.3 |
| 7,031,037 B2 * | 4/2006 | Hirao et al. | 359/3 |
| 7,372,602 B2 * | 5/2008 | Tsukagoshi | 359/35 |

FOREIGN PATENT DOCUMENTS

| | | |
|---|---|---|
| JP | A 63-298836 | 12/1988 |
| JP | B2 2636563 | 4/1997 |
| JP | A 2000-284671 | 10/2000 |
| JP | A 2002-109758 | 4/2002 |

* cited by examiner

*Primary Examiner*—Hoa T Nguyen
*Assistant Examiner*—Kim-Kwok Chu
(74) *Attorney, Agent, or Firm*—Oliff & Berridge, PLC (57) ABSTRACT

In a holographic recording medium, noise is prevented from being generated by servo light in a recording layer without scarifying recording regions. A holographic recording medium 12 has a servo layer 16 formed on a recording layer 14 on a substrate 13 via a spacer layer 15. The servo layer 16 reflects the servo light and has one of wavelength selectivity and incident angle selectivity each of which allows object light and reference light to pass through.

17 Claims, 8 Drawing Sheets

HOLOGRAPHIC RECORDING MEDIUM, METHOD FOR MANUFACTURING THE SAME, AND HOLOGRAPHIC RECORDING-REPRODUCING SYSTEM

TECHNICAL FIELD

The present invention relates to a holographic recording medium which is employed when information is recorded-reproduced by utilizing holography, to a method for manufacturing the holographic recording medium, and to a holographic recording-reproducing optical system.

BACKGROUND ART

In such a type of recording medium or a recording-reproducing system utilizing this medium, information recorded on a holographic recording medium can be reproduced by irradiating reading light on the same position and at the same angle as in reference light. In this case, since the incident conditions of the reading light must be exactly the same as that of the reference light at recording time, tracking and focusing must be performed for irradiating the same position on the recording medium with laser light radiated from a light source for recording-reproducing. Therefore, servo information or address information for detecting the recording position must be recorded on the recording medium.

For example, Japanese Patent Laid-Open Publication No. 2002-109758 discloses a recording medium in which a reflection surface having concavities and convexities is provided in the lower side of a recording layer. This reflection surface is designed so as to reflect position adjustment light from a light source for position adjustment but to allow signal light and reference light from a light source for recording to pass through. Thus, the relative position between the light source for recording and the recording medium is adjusted based on the intensity of the light obtained by reflecting, from the reflection surface, the position adjustment light different from the signal light and the reference light.

Also, for example, the publication of Japanese Patent No. 2636563 discloses a recording medium in which regions for recording signals for position adjustment are provided adjacent to data regions in a recording layer of the recording medium.

In the case of the above recording medium of Japanese Patent Laid-Open Publication No. 2002-109758, since the light reflected from the total reflection type surface having projections and depressions is utilized, servo light has an effect on the recording layer. Therefore, a problem arises that noise becomes large upon recording-reproducing.

Also, in the case of the above recording medium disclosed in the publication of Japanese Patent No. 2636563, the data regions are narrowed, resulting in a problem that storage capacity is reduced.

DISCLOSURE OF THE INVENTION

The present invention is characterized in that a servo layer on which servo information or address information is recorded is formed separately from a recording layer in a light incident side and in that the servo layer is configured so as to reflect servo light but to allow object light and reference light to pass through.

In summary, the above-described objectives are achieved by the following aspects of embodiments.

(1) A holographic recording medium having a recording layer for recording an interference pattern between object light and reference light, characterized by comprising a servo layer formed on a light incident side of the recording layer, having one of wavelength selectivity and incident angle selectivity each of which allows the object light and the reference light to pass through, and reflecting servo light having a wavelength different from those of the object light and the reference light or servo light having an incident angle different from those of the object light and the reference light, wherein one of servo information and address information is recorded on the servo layer.

(2) The holographic recording medium according to (1), wherein the servo layer is constituted by any of a phase type reflection hologram, a dielectric multilayer film, and a dichroic mirror.

(3) The holographic recording medium according to (1), wherein the servo layer is a phase type reflection hologram, comprises a planar diffraction grating having a constant grating space, and is designed so as to reflect the incident servo light satisfying the Bragg condition and to allow the object light and the reference light not satisfying the Bragg condition to pass through.

(4) The holographic recording medium according to (1), wherein the servo layer is formed of a diffraction grating having a multilayer spheric shape and a constant grating space.

(5) The holographic recording medium according to (3) or (4), wherein: the servo layer is composed of a photosensitive material having a refractive index modulated by light irradiation; and the incident angle selectivity is imparted to the servo layer by setting a maximum refractive index modulation factor of the photosensitive material to 0.005 or more and 0.01 or less and a thickness of the servo layer to 5 μm or more and less than 20 μm.

(6) The holographic recording medium according to (3) or (4), wherein: the servo layer is composed of a photosensitive material having a refractive index modulated by light irradiation; and the wavelength selectivity is imparted to the servo layer by setting a maximum refractive index modulation factor of the photosensitive material to 0.0008 or more and 0.005 or less and a thickness of the servo layer to 20 μm or more and 100 μm or less.

(7) A method for manufacturing a holographic recording medium, characterized by: allowing coherent plane wave laser light beams having the same wavelength to be vertically incident on both sides of a servo layer composed of a material capable of forming a reflection type diffraction grating by interference fringes of two laser light beams to thereby form, inside the servo layer, a planar diffraction grating having a constant grating space; and laminating the servo layer having the planar diffraction grating formed therein on a recording layer formed on a substrate via a spacer layer.

(8) A method for manufacturing a holographic recording medium, characterized by: arranging a servo layer on both sides of an interference control mask with the interference control mask sandwiched therebetween, the servo layer composed of a material capable of forming a reflection type diffraction grating by interference fringes of two laser light beams; irradiating two laser light beams split by a beam splitter from both sides of a pair of the servo layers such that the interference control mask serves as a common focal point to thereby form in each of the servo layers a spheric diffraction grating in which the common focal point serves as the sphere center and the symmetry center; stripping both the servo layers from the interference control mask; and applying both the servo layers to a spacer layer of a laminate configured by laminating a substrate, a holographic recording layer, and the spacer layer in this order.

A holographic recording-reproducing optical system, comprising: the holographic recording medium according to any of (1) to (6); a servo optical system which branches off part of laser light by a beam splitter and forms servo light incident on the holographic recording medium at nearly right angles to the servo layer; a polarizing beam splitter which splits the laser light branched off in a direction different from that of the servo light by the beam splitter into two linearly polarized light beams having orthogonal vibration planes; a reference optical system which allows one of the linearly polarized light beams split by the polarizing beam splitter to be incident on the holographic recording medium as reference light from a direction different from that of the servo light; an object optical system which allows the other of the linearly polarized light beams split by the polarizing beam splitter to be incident on the holographic recording medium as object light from a direction different from that of the servo light and the reference light; and a photodetector which detects the reflection of the servo light from the servo layer, wherein: the reference optical system comprises, in order from the polarizing beam splitter side, a ½ wave plate and a Fourier lens; the object optical system comprises, in order from the polarizing beam splitter side, a spatial light modulator for modulating the linearly polarized light beam according to information to be recorded and a Fourier lens; the servo optical system comprises, in order from the beam splitter side, a second polarizing beam splitter, a ¼ wave plate, and a condensing lens; the second polarizing beam splitter is designed so as to allow one of two linearly polarized light beams having orthogonal vibration planes to pass through and to reflect the other; and the photodetector is provided on a reflection optical path which is formed when the reflection of the servo light from the servo layer is incident on the second polarizing beam splitter, the servo light being incident on the servo layer after passing through the second polarizing beam splitter.

BEST MODE FOR CARRYING OUT THE INVENTION

In the best mode of the present invention, a servo layer comprising a phase type reflection hologram is provided separately from a recording layer in a light incident side, thereby achieving the objectives of reducing noise due to servo light or the reflection thereof upon recording-reproducing without reducing data regions.

The holographic recording-reproducing system according to a first exemplary embodiment of the present invention will next be described.

Figure 1:
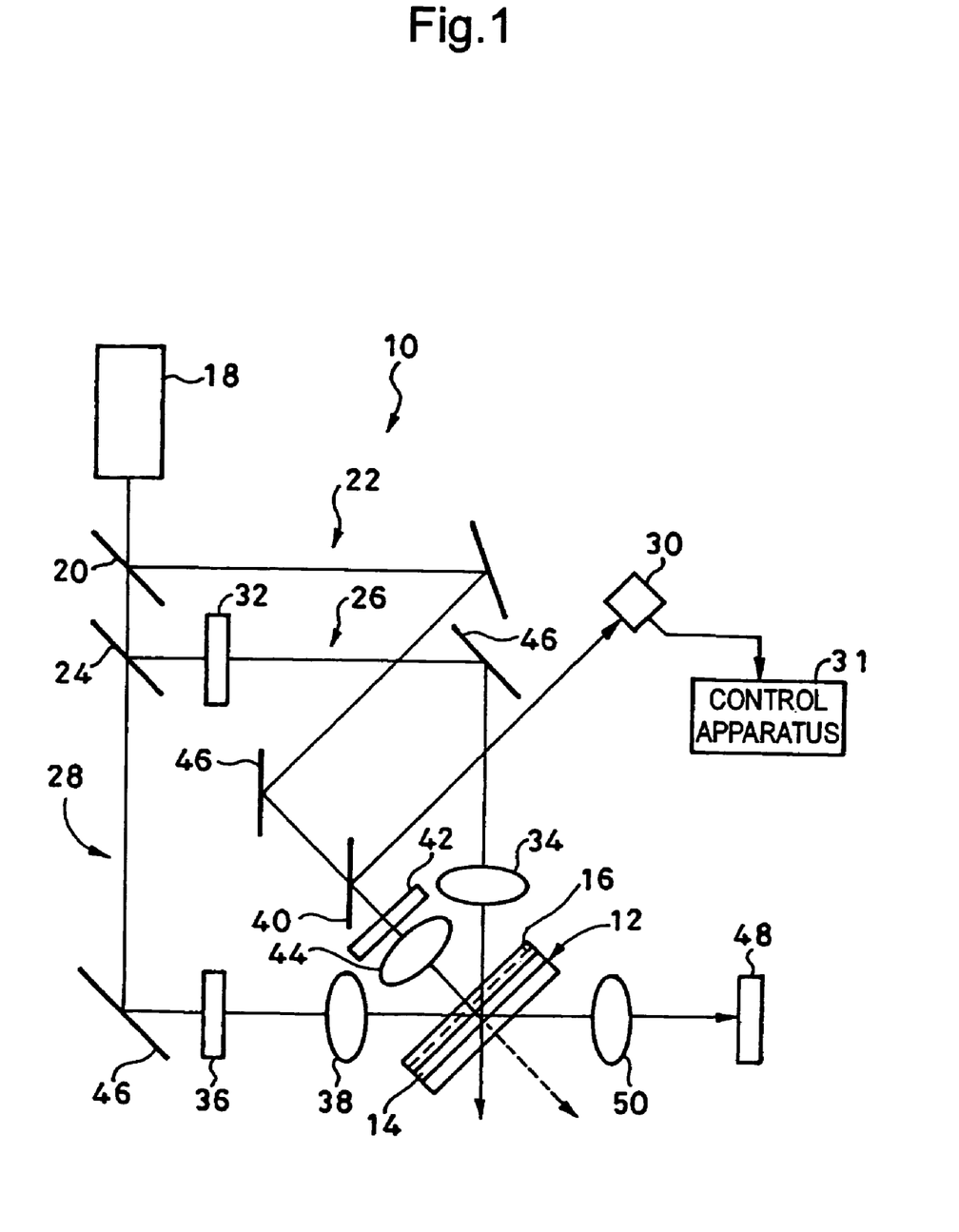
FIG. 1 is an optical system diagram illustrating the holographic recording-reproducing system according to a first exemplary embodiment of the present invention.

As shown in FIG. 1, the holographic recording-reproducing system 10 according to the exemplary embodiment of the present invention records and reproduces information on and from a holographic recording medium 12.

Figure 2:
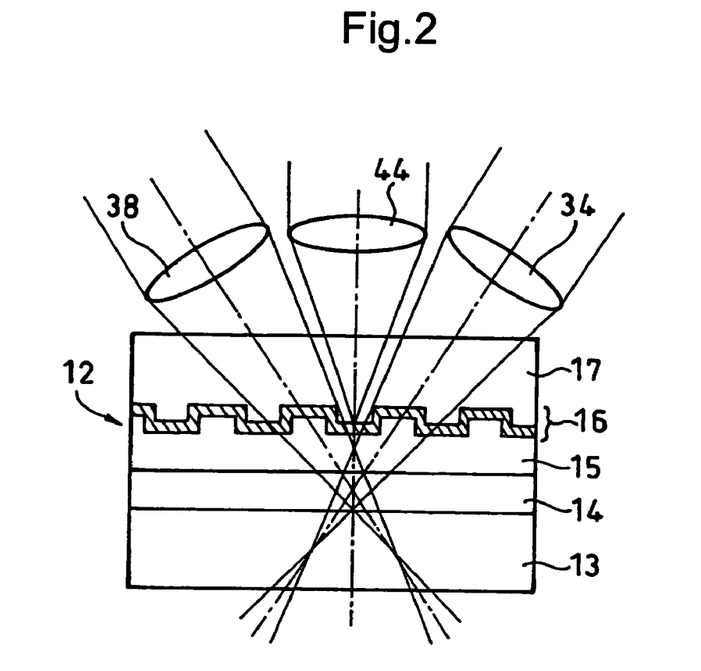
FIG. 2 is a schematic enlarged cross-sectional view illustrating a holographic recording medium of the first exemplary embodiment.

As shown in FIG. 2, the holographic recording medium 12 has a recording layer 14 for recording interference patterns between object light and reference light and also has a servo layer 16 formed separately from the recording layer in a light incident side. The servo layer 16 allows the object light and the reference light to pass through and reflects servo light having an incident angle different from those of the object light and the reference light, and one of servo information and address information is recorded on the servo layer 16.

The numeral 13 in FIG. 2 designates a substrate, and the recording layer 14 is formed on the substrate 13. A spacer layer 15 is provided on the recording layer 14 and holds the servo layer 16 and the recording layer 14 in a separated state. Further, a protection layer 17 is provided on the servo layer 16, i.e., on the upper side thereof in FIG. 2.

Figure 3:
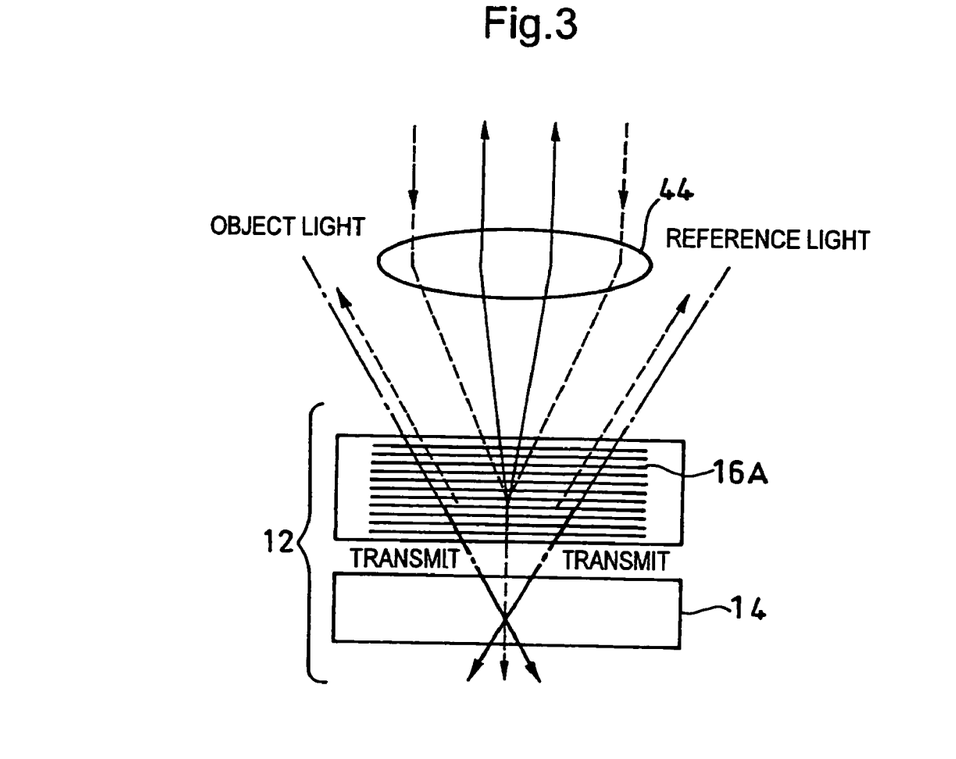
FIG. 3 is a schematic view illustrating the action of a planar diffraction grating forming a servo layer in the first exemplary embodiment.

The servo layer 16 is a phase type reflection hologram and comprises a number of planar diffraction gratings 16A having a constant grating space (see FIG. 3). The servo layer 16 is designed so as to reflect the incident servo light satisfying the Bragg condition and to transmit the object light and the reference light not satisfying the Bragg condition.

The holographic recording-reproducing system 10 comprises: a servo optical system 22 which branches off part of laser light from a laser light source 18 by a beam splitter 20 to form the servo light incident on the holographic recording medium 12 at nearly right angles to the servo layer 16; a polarizing beam splitter 24 which splits the laser light branched off in a direction different from that of the servo light by the beam splitter 20 into two linearly polarized light beams having orthogonal vibration planes; a reference optical system 26 which allows one of the linearly polarized light beams split by the polarizing beam splitter 24 to be incident on the holographic recording medium 12 as the reference light from a direction different from that of the servo light; an object optical system 28 which allows the other of the linearly polarized light beams split by the polarizing beam splitter 24 to be incident on the holographic recording medium 12 as the object light from a direction different from those of the servo light and the reference light; a photodetector 30 which detects the reflection of the servo light from the servo layer; and a control apparatus 31 which forms a position signal of the holographic recording medium 12 based on the output signal of the photodetector 30.

The reference optical system 26 comprises, in order from the polarizing beam splitter 24 side, a ½ wave plate 32 and a Fourier lens 34. The object optical system 28 comprises, in order from the polarizing beam splitter 24 side, a spatial light modulator (hereinafter SLM) 36 that modulates the linearly polarized light beam according to the information to be recorded and a Fourier lens 38.

The servo optical system 22 comprises, in order from the beam splitter 20 side, a second polarizing beam splitter 40, a ¼ wave plate 42, and a condensing lens 44. The second polarizing beam splitter 40 is provided so as to allow one of two linearly polarized light beams having orthogonal vibration planes to pass through and to reflect the other. The servo light passing through the second polarizing beam splitter 40 is incident on the servo layer 16 and is reflected therefrom. The photodetector 30 is provided on a reflection optical path which is formed when the above light reflected from the servo layer 16 is incident on the second polarizing beam splitter 40. The condensing lens 44 is provided so as to condense the servo light on the servo layer 16.

The numeral 46 in FIG. 1 designates a total reflection mirror arranged in each of the optical paths, and the numeral 48 designates an imaging device (hereinafter CCD) for receiving, via a Fourier lens 50, the diffracted light which is generated by the reference light upon reproducing the data recorded on the holographic recording medium 12. In this exemplary embodiment, the beam splitter 20 is constituted by a half mirror.

The configuration of the servo layer 16 in the holographic recording medium 12 will be described in more detail.

FIG. 3 schematically shows the case where the servo layer 16 is constituted by a reflection type phase hologram. In this case, the reflection type phase hologram comprises a number of planar diffraction gratings 16A having a constant grating space. The reflection type phase hologram is configured so as to reflect the servo light shown by the broken lines in FIG. 3 in a manner shown by the solid lines where the servo light is perpendicularly incident on the reflection type phase hologram and satisfies the Bragg condition. Furthermore, the reflection type phase hologram is configured so as to allow the object light and the reference light to pass through as shown by the alternate long and short dashed lines where the object light and the reference light are incident on the reflection type phase hologram at an angle different from that of the servo light.

As described above, by allowing the servo light to satisfy the Bragg condition and the object light and the reference light not to satisfy the Bragg condition, the object light and the reference light reach the recording layer 14 without being interfered with the servo layer 16. Also, the servo light is totally reflected from the servo layer 16 and thus does not reach the recording layer 14. Therefore, noise is not generated by the servo light.

Next, a process will be described for recording and reproducing information on and from the holographic recording medium 12 by means of the holographic recording-reproducing system 10.

Part of the laser light emitted from the laser light source 18 passes through the beam splitter 20, and the rest thereof is reflected in a lateral direction in FIG. 1. The laser light reflected in the lateral direction enters the servo optical system 22, is reflected from the two total reflection mirrors 46, and then is incident on the second polarizing beam splitter 40.

In the incident laser light, only one of two linearly polarized light beams having orthogonal polarization planes passes through the second polarizing beam splitter 40 and further is phase-modulated by the ¼ wave plate 42, thereby forming circularly or elliptically polarized light. This polarized light serves as the servo light which is condensed on the servo layer 16 of the holographic recording medium 12 by the condensing lens 44.

This servo light satisfies the Bragg condition in the planar diffraction grating 16A constituting the servo layer 16. Thus, the servo light is reflected from the diffraction grating 16A and follows the incident optical path toward the second polarizing beam splitter 40.

The reflected servo light passes through the condensing lens 44 and the ¼ wave plate 42 and is converted to linearly polarized light. However, since the phase of the reflected servo light is shifted by 180° upon being reflected from the servo layer 16, the reflected servo light is converted to linearly polarized light having the vibration plane which allows the light to be reflected from the second polarizing beam splitter 40.

Therefore, the reflection of the servo light from the servo layer 16 is reflected from the second polarizing beam splitter 40 in the lateral direction and is incident on the photodetector 30. According to the output of the photodetector 30, the control apparatus 31 obtains the servo information or the address information.

On the other hand, the laser light passing through the beam splitter 20 is split by the polarizing beam splitter 24 into two linearly polarized light beams having orthogonal vibration planes. The reflected linearly polarized light is incident on the reference optical system 26, and the transmitted linearly polarized light is incident on the object optical system 28.

In the reference optical system 26, the phase of the linearly polarized light is shifted by 180° in the ½ wave plate 32, thereby forming the linearly polarized light having the same vibration plane as that of the linearly polarized light incident on the object optical system 28.

This linearly polarized light is reflected from the total reflection mirror 46, passes through the Fourier lens 34, and then is incident on the holographic recording medium 12 as the reference light.

The linearly polarized light passing through the polarizing beam splitter 24 is reflected from the total reflection mirror 46 in the object optical system 28 and then is modulated by the SLM 36 based on the information to be recorded. Subsequently, the modulated light passes through the Fourier lens 38 and is incident on the recording layer 14 of the holographic recording medium 12. On the recording layer 14, the modulated light interferes with the linearly polarized light from the reference optical system 26 to form interference fringes, and thus the information is holographically recorded.

In this case, since the servo light incident from the servo optical system 22 satisfies the Bragg condition in the servo layer 16, most of the servo light is reflected and does not reach the recording layer 14. Therefore, noise due to the servo light is reduced on the recording layer 14.

The action upon reproduction in the servo layer 16 comprising the planar diffraction grating 16A will be described in more detail.

Figure 5:
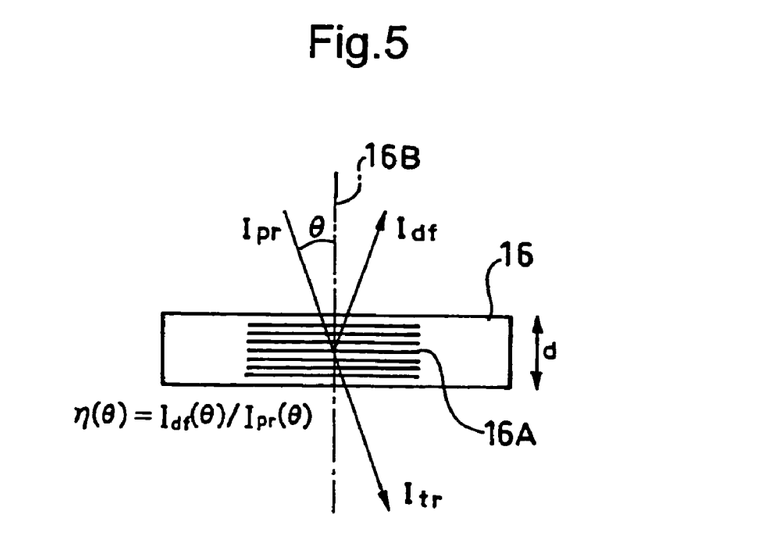
FIG. 5 is a schematic view illustrating the relationship of incident servo light with diffracted light and transmitted light in the planar diffraction grating.

As shown in FIG. 5, the servo layer 16 manufactured by a manufacturing method to be described later is composed of a transparent material which changes its refractive index upon being exposed to light, with a thickness of d (μm). During information reproduction, when the servo light is incident on the servo layer 16 in a direction having θ with respect to a normal line 16B (see the alternate long and short dashed line in FIG. 5), part thereof is reflected by diffraction such that the bisector between the reflection direction and the incident direction is coincident with the normal line. In this case, the rest passes through.

The beam intensities of the servo light (the incident light), the diffracted light, and the transmitted light are designated by $I_{pr}$, $I_{df}$ and $I_{tr}$, respectively, and the diffraction efficiency η of the servo layer 16 is given by $I_{df}/I_{pr}$. That is, as the servo light approaches the normal line 16B, the diffraction efficiency increases, and thus the reflection intensity from the servo layer increases.

In addition, in this exemplary embodiment, since the servo light, the object light, and the reference light have the same wavelength, a light source dedicated for the servo light is not required to be separately provided (However, if the servo layer 16 is constituted by a dichroic mirror, a light source dedicated for the servo light must be separately provided).

As shown in FIG. 2, the servo layer 16 has a shape having concavities and convexities. Further, the servo layer 16 is configured such that the planar diffraction grating 16A is formed in portions corresponding to the bottom, in FIG. 2, of the concavities and convexities and that portions corresponding to the top partition each of the planar diffraction gratings 16A.

Figure 4:
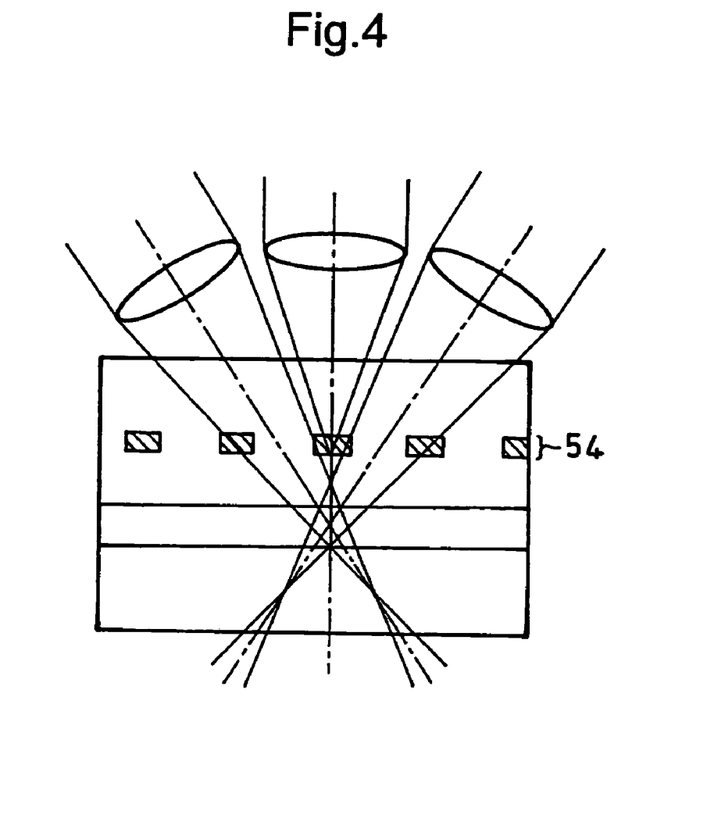
FIG. 4 is a cross-sectional view similar to FIG. 2, illustrating a holographic recording medium having a servo layer of another mode.

The servo layer 16 shown in FIG. 2 has a shape having concavities and convexities. However, for example, as in a servo layer 54 shown in FIG. 4, the planar diffraction gratings 16A may be formed with intervals in a plane direction.

Figure 6:
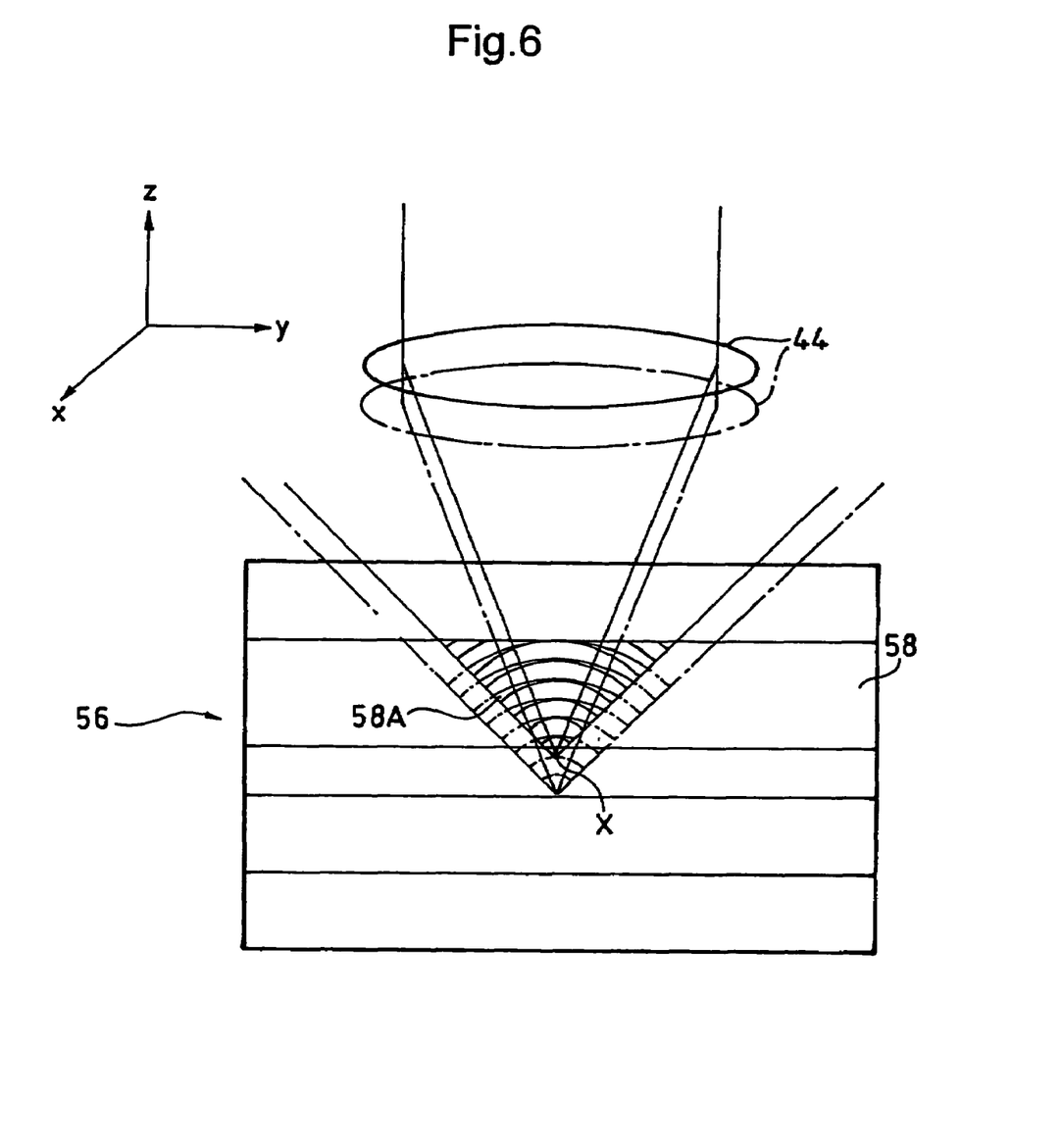
FIG. 6 is a schematic enlarged cross-sectional view illustrating the holographic recording medium according to another exemplary embodiment of the present invention.

Further, although the servo layer 16 or 54 is configured by the planar diffraction gratings 16A, the servo layer may be configured by, for example, a diffraction grating 58A provided in a servo layer 58 as in a holographic recording medium 56 shown in FIG. 6. The diffraction grating 58A has a constant grating space and has a multi-layer spheric shape having the center at a point X which is shifted from the servo layer 58 in the light-outgoing direction (the point X may be shifted in the opposite direction).

In the case of the holographic recording medium 56, the servo light incident on the central point X exhibits the maximum diffraction efficiency. Thus, when the servo light is incident along the normal line of the servo layer 58, the deviation between the servo light serving as a spherical wave and the diffraction grating 58A is generated to decrease the diffraction efficiency if the central optical axis of the servo light is shifted in a plane direction from the central point X. This deviation is also generated to decrease the diffraction efficiency if the central optical axis is shifted along the normal line as shown by the alternate long and short dashed line in FIG. 6. Therefore, in the case of the holographic recording medium 56, positional servo control can be performed in the direction perpendicular thereto (the optical axis direction of the servo light).

Figure 7:
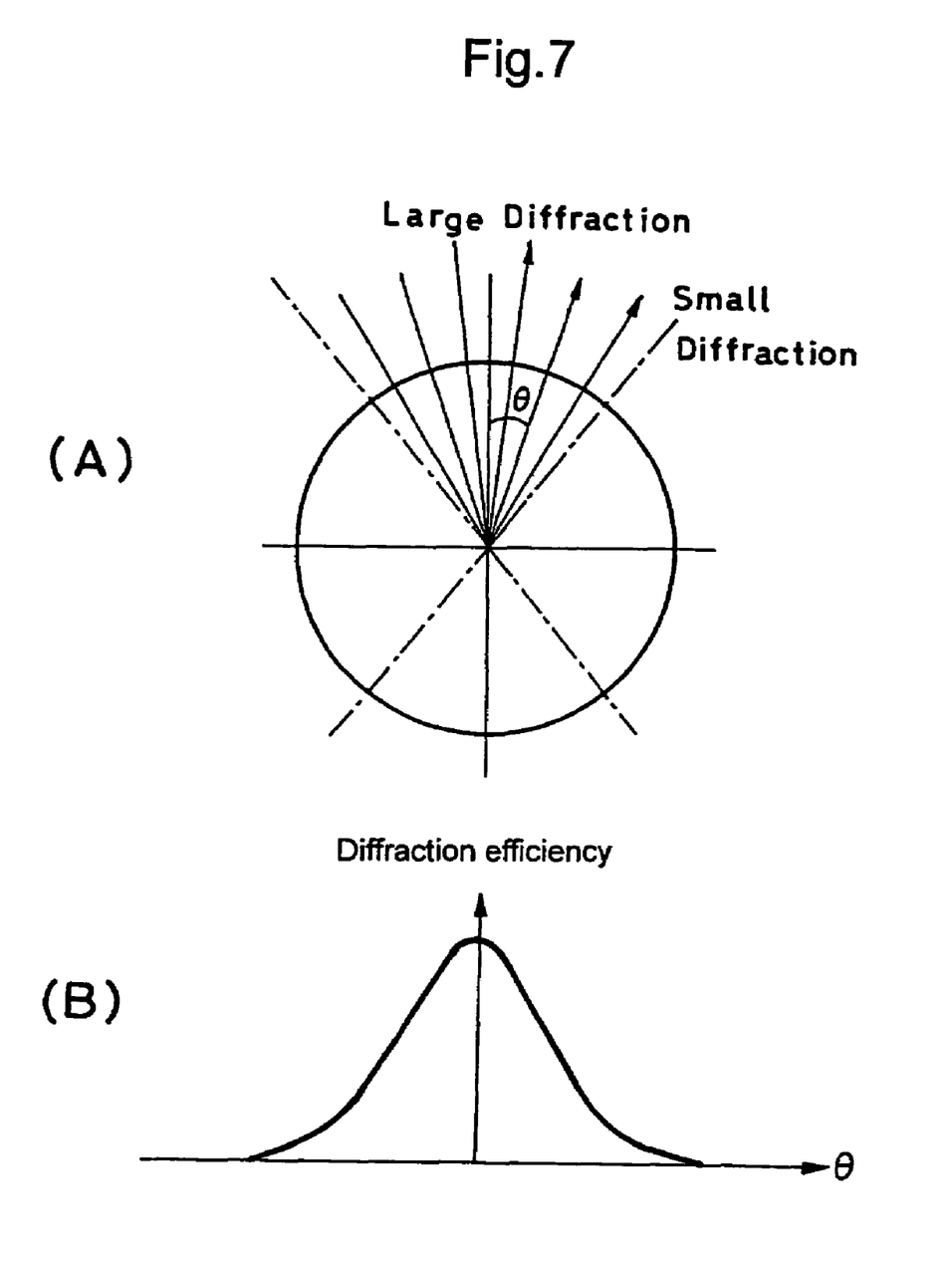
FIG. 7 is a diagram illustrating the relationship between the incident angle of the servo light and diffraction efficiency in the servo layer of the holographic recording medium shown in FIG. 6.

Also, as shown in FIG. 6, when the incident servo light is a spherical wave, the angle between the spheric diffraction grating 58A and the wavefront of the servo light increases as the distance from the optical axis increases, causing the Bragg condition not to be satisfied. Consequently, as shown in FIGS. 7(A) and (B), the servo light is strongly diffracted (reflected) only around the center thereof, and the returning light is weakened in a region further away from the optical axis.

Therefore, by monitoring the light intensity of the returning light by use of the photodetector 30, the positional servo control may be performed in the X, Y, and Z directions simultaneously. Also, the positional servo control may be performed in the X and Y directions based on the light intensity of the returning light and in the Z direction based on the intensity distribution thereof.

Next, a manufacturing method of the holographic recording medium 56 provided with the servo layer 58 including the spheric diffraction grating 58A will be described.

Figure 8:
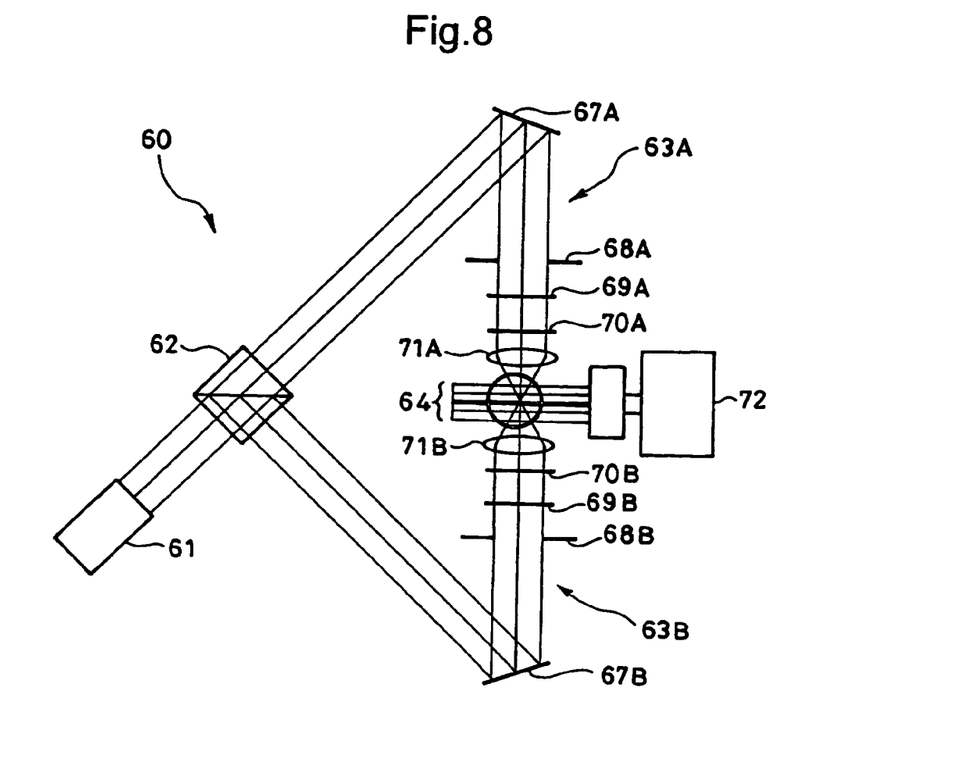
FIG. 8 is an optical system diagram, partially including a block diagram, illustrating an apparatus for manufacturing a servo disc having a spheric diffraction grating of the same exemplary embodiment shown in FIG. 6.

FIG. 8 shows a manufacturing apparatus 60 for forming a spheric diffraction grating in a servo layer. This manufacturing apparatus 60 comprises a laser light source 61 and a beam splitter 62 which splits the laser light emitted from the laser light source 61 into two beams. The split two laser light beams in a coherent state are incident on a servo disc laminate 64 from the opposite sides thereof so as to be opposed to each other. Then, spheric interference fringes are formed due to the interference of the laser light beams and serve as the above-mentioned spheric diffraction grating 58A.

Figure 9:
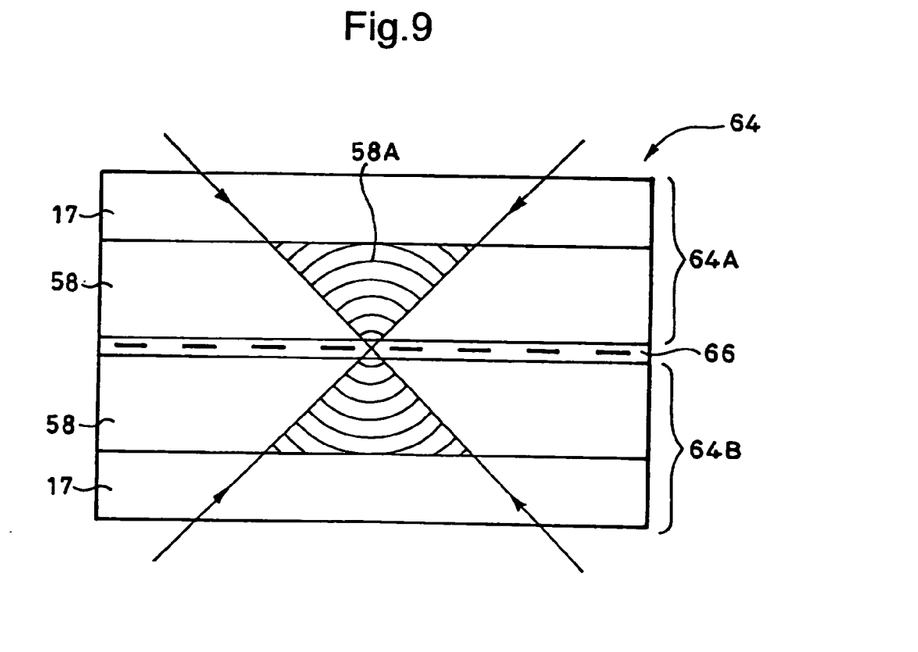
FIG. 9 is an enlarged cross-sectional view schematically illustrating a state in which the spheric diffraction grating is formed in a servo layer by means of the manufacturing apparatus shown in FIG. 8.

As shown in FIG. 9, the servo disc laminate 64 is formed such that an interference control mask 66 is sandwiched between a pair of servo layers 58, and a protection layer 17 is further laminated on both sides. That is, a first servo disc 64A and a second servo disc 64B are laminated with the interference control mask 66 sandwiched therebetween.

A first interference optical system 63A and a second interference optical system 63B are for guiding the two laser light beams split by the beam splitter 62 to the servo disc laminate 64 in an opposed manner. The first and second interference optical systems 63A and 63B comprise, in order from the beam splitter 62 side, mirrors 67A and 67B, iris diaphragms 68A and 68B, first polarizers 69A and 69B, second polarizers 70A and 70B, and objective lenses 71A and 71B, respectively, in a vertically symmetrical manner in FIG. 8. The first and second interference optical systems 63A and 63B are designed such that the two split laser light beams have the common focal point formed in the interference control mask 66 located at the center of the servo disc laminate 64.

The numeral 72 in FIG. 8 designates a translation stage for moving the servo disc laminate 64 orthogonally to the laser light.

In the interference control mask 66, a pattern having the same pitch as that of shift multiplex is formed, and the formation position of the spheric diffraction grating is automatically adjusted. At the same time, the grating size is adjusted by the iris diaphragms 68A and 68B, and the intensity of the interference fringes is adjusted by the four polarizers 69A, 69B, 70A, and 70B. In this manner, a spheric reflection type diffraction grating having the desired optical properties can be produced.

Figure 10:
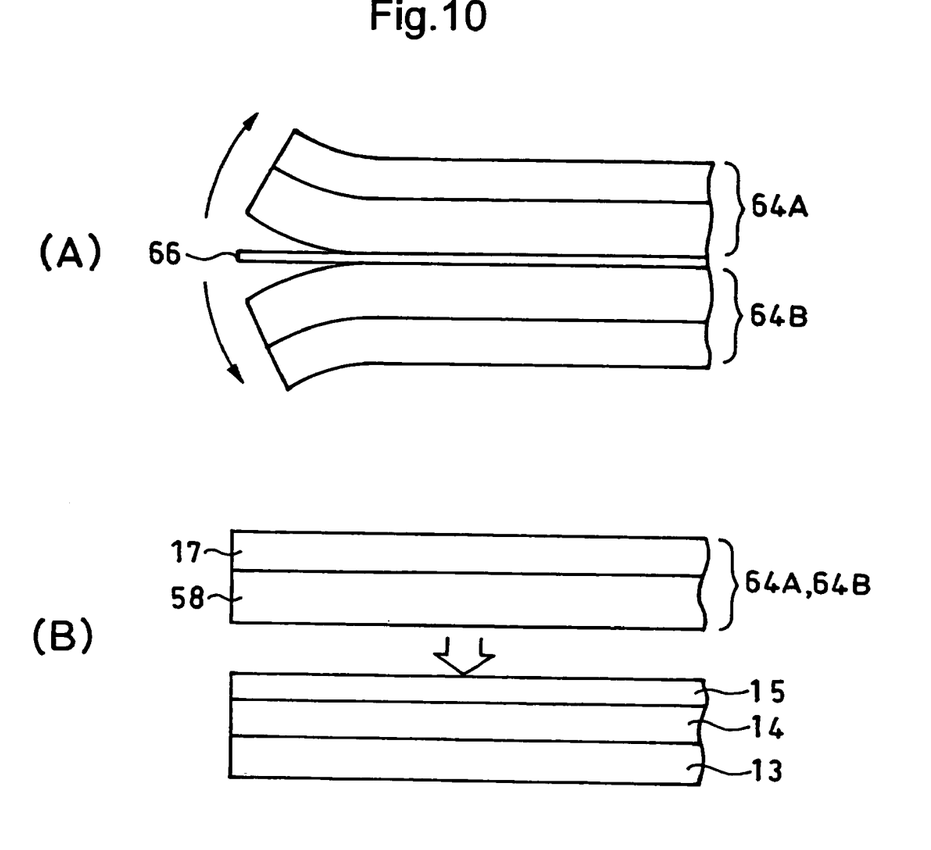
FIG. 10 is a simplified cross-sectional view illustrating a process for manufacturing the holographic recording medium by use of the servo disc having the spheric diffraction grating formed therein.

After the spheric diffraction grating 58A is formed in the servo layers 58 as described above, the first and second servo discs 64A and 64B are stripped from the interference control mask 66 as shown in FIG. 10(A). Subsequently, the stripped first and second servo discs 64A and 64B are applied to a laminate such that the side having the servo layers 58 faces thereto, as shown in FIG. 10(B). This laminate is similar to that shown in FIGS. 2 and 3 and comprises the substrate 13, the recording layer 14, and the spacer layer 15. Thus, the holographic recording medium is completed.

Figure 11:
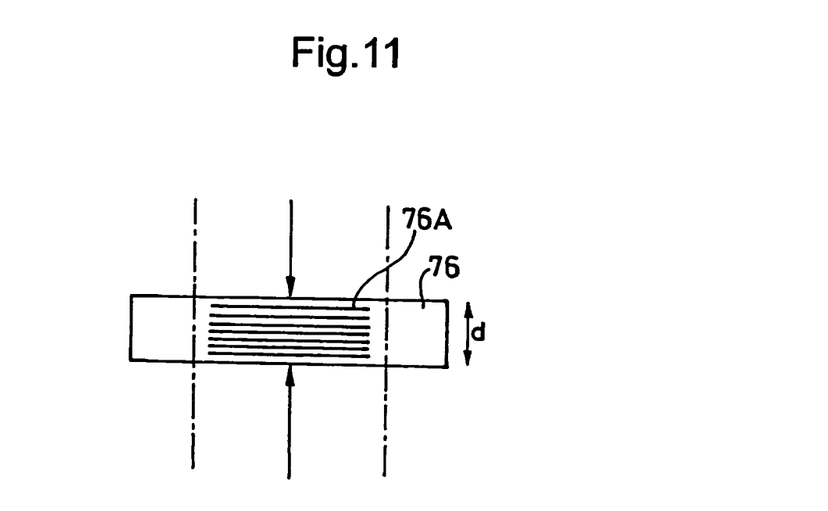
FIG. 11 is a simplified cross-sectional view illustrating the essential part in the process of forming the planar diffraction grating in the servo layer.

When the planar diffraction grating 16A shown in FIG. 3 is formed, this planar diffraction grating is formed by use of an apparatus similar to the manufacturing apparatus 60 shown in FIG. 8. However, in this case, plane wave-like laser light beams in a coherent state are incident on both the sides of a servo layer 76 to form a planer diffraction grating 76A in the servo layer 76 as shown in FIG. 11.

Next, the setting for imparting to the servo layer either wavelength selectivity or incident angle selectivity such that the object light and the reference light pass through the servo layer will be described.

The currently available photosensitive material serving as a material for the servo layer has a maximum refractive index modulation factor Δn of about 0.01. By adjusting a light exposure when a diffraction grating is recorded, any Δn of 0.01 or less can be formed.

Figure 12:
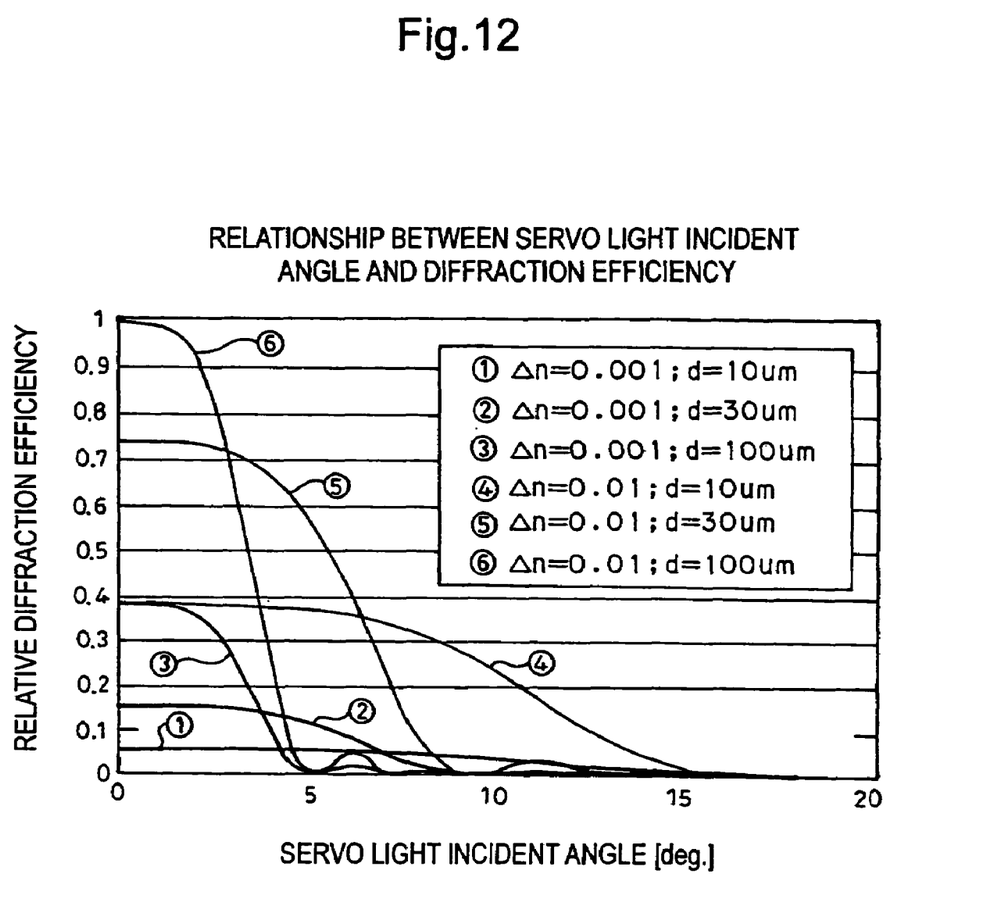
FIG. 12 is a diagram showing the relationship of the diffraction efficiency with the refractive index modulation factor of a servo layer material, the incident angle of the servo light, and the thickness of the servo layer.

FIG. 12 shows the diffraction efficiency for thicknesses of a photosensitive material (the servo layer) of 10, 30, and 100 μm when Δn of a servo layer material are 0.001 and 0.01. In this case, when a diffraction grating was recorded in the servo layer, the servo layer for the servo light was perpendicularly irradiated from both the sides thereof by use of two laser light beams in a similar manner as shown in FIG. 8 or 11. Also, during reproduction (servo control), the laser light having the same wavelength as that of the laser light employed upon recording was employed as the servo light and was incident on the servo layer at an inclined angle θ with respect to the normal line thereof to thereby obtain the shown diffraction efficiency.

As can be seen from FIG. 12, as the refractive index modulation factor Δn increases, the absolute value of the diffraction efficiency increases. On the other hand, as the thickness of the servo layer increases, the absolute value of the diffraction efficiency increases, and the half-width in the incident angle decreases to cause the angle selectivity to be strongly exerted.

Therefore, by controlling the refractive index modulation factor Δn and the thickness d of the servo layer, the servo layer having arbitrary diffraction efficiencies and angular tolerance can be formed.

That is, according to the optical design of the servo light, the object light, and the reference light, the servo layer can be freely designed which reflects the servo light only and allows the servo light and the object light to pass through. In addition, a reflectivity with respect to the servo light (the diffraction efficiency in FIG. 11) can be set to an arbitrary value.

For example, the incident angle selectivity is imparted by setting the maximum refractive index modulation factor of a photosensitive material for the servo layer to 0.005 or more and 0.01 or less and the servo layer thickness to 5 μm or more and less than 20 μm. Alternatively, the wavelength selectivity is imparted by setting the maximum refractive index modulation factor of a photosensitive material to 0.0008 or more and 0.005 or less and the servo layer thickness to 20 μm or more and 100 μm or less.

FIG. 12 shows the case where all of the servo light, the object light, and the reference light are the laser light having the same wavelength, but the present invention is not limited thereto. The wavelength of the servo light may be different from that of the object light and the reference light. If the wavelengths are different, the object light and the reference light pass through the servo layer irrespective to the incident angle of the servo light. Therefore, the design freedom of the servo layer further increases.

In each of the above exemplary embodiments, the phase type reflection hologram is employed as the servo layer, but the present invention is not limited thereto. Either of a dielectric multilayer film and a dichroic mirror may be employed.

INDUSTRIAL APPLICABILITY

In the holographic recording medium of the present invention, the servo layer is formed separately from the recording layer in the light incident side and is configured such that the servo light is reflected therefrom and the object light and the reference light are allowed to pass therethrough. Therefore, noise upon recording-reproducing is reduced, and the recording regions for servo information and address information can be formed without sacrificing data recording regions.

The invention claimed is:

1. A holographic recording medium comprising:
   a recording layer having an interference pattern recorded thereon using object light and reference light emitted from a laser light source; and
   a servo layer formed above the recording layer so as to face a direction of incident light, the servo layer having convexities and concavities that impart one of wavelength selectivity and incident angle selectivity, each of the wavelength selectivity and the incident angle selectivity allowing the object light and the reference light to pass through the servo layer before incident onto the recording layer,
   wherein the servo layer reflects servo light having a wavelength different from a wavelength of the object light and a wavelength of the reference light or the servo layer reflects servo light having an incident angle different from an incident angle of the object light and an incident angle of the reference light, and
   one of servo information and address information is recorded on the servo layer.

2. The holographic recording medium according to claim 1, wherein the servo layer is a phase type reflection hologram that comprises a planar diffraction grating having a constant grating space, and the servo layer reflects the incident servo light satisfying the Bragg condition and allows the object light and the reference light not satisfying the Bragg condition to pass through.

3. The holographic recording medium according to claim 2, wherein: the servo layer is composed of a photosensitive material having a refractive index modulated by light irradiation; and the incident angle selectivity is imparted to the servo layer by setting a maximum refractive index modulation factor of the photosensitive material to 0.005 or more and 0.01 or less and a thickness of the servo layer to 5 μm or more and less than 20 μm.

4. A holographic recording-reproducing optical system, comprising:
   the holographic recording medium according to claim 3;
   a servo optical system including a beam splitter that branches off a portion of light to form servo light incident on the holographic recording medium at nearly right angles to the servo layer;
   a polarizing beam splitter which splits the light branched off in a direction different from that of the servo light by the beam splitter into two linearly polarized light beams having orthogonal vibration planes;
   a reference optical system which allows one of the linearly polarized light beams split by the polarizing beam splitter to be incident on the holographic recording medium as reference light from a direction different from that of the servo light;
   an object optical system which allows the other of the linearly polarized light beams split by the polarizing beam splitter to be incident on the holographic recording medium as object light from a direction different from that of the servo light and the reference light; and
   a photodetector which detects the reflection of the servo light from the servo layer, wherein:
   the reference optical system comprises, in order from a polarizing beam splitter side, a ½ wave plate and a Fourier lens;

the object optical system comprises, in order from the polarizing beam splitter side, a spatial light modulator for modulating the linearly polarized light beam according to information to be recorded and a Fourier lens;

he servo optical system comprises, in order from a beam splitter side, a second polarizing beam splitter, a ¼ wave plate, and a condensing lens;

the second polarizing beam splitter allows one of two linearly polarized light beams having orthogonal vibration planes to pass through and reflects the other; and the photodetector is provided on a reflection optical path which is formed when the reflection of the servo light from the servo layer is incident on the second polarizing beam splitter, the servo light being incident on the servo layer after passing through the second polarizing beam splitter.

5. The holographic recording medium according to claim 2, wherein: the servo layer is composed of a photosensitive material having a refractive index modulated by light irradiation; and the wavelength selectivity is imparted to the servo layer by setting a maximum refractive index modulation factor of the photosensitive material to 0.0008 or more and 0.005 or less and a thickness of the servo layer to 20 μm or more and 100 μm or less.

6. A holographic recording-reproducing optical system, comprising:

the holographic recording medium according to claim 5;

a servo optical system including a beam splitter that branches off a portion of light to form servo light incident on the holographic recording medium at nearly right angles to the servo layer;

a polarizing beam splitter which splits the light branched off in a direction different from that of the servo light by the beam splitter into two linearly polarized light beams having orthogonal vibration planes;

a reference optical system which allows one of the linearly polarized light beams split by the polarizing beam splitter to be incident on the holographic recording medium as reference light from a direction different from that of the servo light;

an object optical system which allows the other of the linearly polarized light beams split by the polarizing beam splitter to be incident on the holographic recording medium as object light from a direction different from that of the servo light and the reference light; and a photodetector which detects the reflection of the servo light from the servo layer, wherein:

the reference optical system comprises, in order from a polarizing beam splitter side, a ½ wave plate and a Fourier lens;

the object optical system comprises, in order from the polarizing beam splitter side, a spatial light modulator for modulating the linearly polarized light beam according to information to be recorded and a Fourier lens;

the servo optical system comprises, in order from a beam splitter side, a second polarizing beam splitter, a ¼ wave plate, and a condensing lens;

the second polarizing beam splitter allows one of two linearly polarized light beams having orthogonal vibration planes to pass through and reflects the other; and the photodetector is provided on a reflection optical path which is formed when the reflection of the servo light from the servo layer is incident on the second polarizing beam splitter, the servo light being incident on the servo layer after passing through the second polarizing beam splitter.

7. A holographic recording-reproducing optical system, comprising:

the holographic recording medium according to claim 2;

a servo optical system including a beam splitter that branches off a portion of light to form servo light incident on the holographic recording medium at nearly right angles to the servo layer;

a polarizing beam splitter which splits the light branched off in a direction different from that of the servo light by the beam splitter into two linearly polarized light beams having orthogonal vibration planes;

a reference optical system which allows one of the linearly polarized light beams split by the polarizing beam splitter to be incident on the holographic recording medium as reference light from a direction different from that of the servo light;

an object optical system which allows the other of the linearly polarized light beams split by the polarizing beam splitter to be incident on the holographic recording medium as object light from a direction different from that of the servo light and the reference light; and a photodetector which detects the reflection of the servo light from the servo layer, wherein:

the reference optical system comprises, in order from a polarizing beam splitter side, a ½ wave plate and a Fourier lens;

the object optical system comprises, in order from the polarizing beam splitter side, a spatial light modulator for modulating the linearly polarized light beam according to information to be recorded and a Fourier lens;

the servo optical system comprises, in order from a beam splitter side, a second polarizing beam splitter, a ¼ wave plate, and a condensing lens;

the second polarizing beam splitter allows one of two linearly polarized light beams having orthogonal vibration planes to pass through and reflects the other; and the photodetector is provided on a reflection optical path which is formed when the reflection of the servo light from the servo layer is incident on the second polarizing beam splitter, the servo light being incident on the servo layer after passing through the second polarizing beam splitter.

8. A method for manufacturing the servo layer of the holographic recording medium of claim 1, the method comprising:

allowing coherent plane wave laser light beams having the same wavelength to be vertically incident on both sides of the servo layer composed of a material capable of forming a reflection type diffraction grating by interference fringes of two laser light beams to thereby form, inside the servo layer, a planar diffraction grating having a constant grating space; and laminating the servo layer having the planar diffraction grating formed therein on a recording layer formed on a substrate via a spacer layer.

9. A method for manufacturing servo layers of a holographic recording medium, each of the servo layers corresponding to the servo layer of the holographic recording medium of claim 1, the method comprising:

arranging a servo layer on both sides of an interference control mask with the interference control mask sandwiched therebetween, each servo layer composed of a material capable of forming a reflection type diffraction grating by interference fringes of two laser light beams;

irradiating two laser light beams split by a beam splitter from both sides of a pair of the servo layers such that the interference control mask serves as a common focal point to thereby form in each of the servo layers a spheric diffraction grating in which the common focal point serves as a sphere center and a symmetry center;
stripping both the servo layers from the interference control mask; and
applying both the servo layers to a spacer layer of a laminate, the laminate configured by laminating a substrate, a holographic recording layer, and the spacer layer in this order.

10. A holographic recording-reproducing optical system, comprising:
the holographic recording medium according to claim 1;
a servo optical system including a beam splitter that branches off a portion of light to form servo light incident on the holographic recording medium at nearly right angles to the servo layer;
a polarizing beam splitter which splits the light branched off in a direction different from that of the servo light by the beam splitter into two linearly polarized light beams having orthogonal vibration planes;
a reference optical system which allows one of the linearly polarized light beams split by the polarizing beam splitter to be incident on the holographic recording medium as reference light from a direction different from that of the servo light;
an object optical system which allows the other of the linearly polarized light beams split by the polarizing beam splitter to be incident on the holographic recording medium as object light from a direction different from that of the servo light and the reference light; and
a photodetector which detects the reflection of the servo light from the servo layer, wherein:
the reference optical system comprises, in order from a polarizing beam splitter side, a ½ wave plate and a Fourier lens;
the object optical system comprises, in order from the polarizing beam splitter side, a spatial light modulator for modulating the linearly polarized light beam according to information to be recorded and a Fourier lens;
the servo optical system comprises, in order from a beam splitter side, a second polarizing beam splitter, a ¼ wave plate, and a condensing lens;
the second polarizing beam splitter allows one of two linearly polarized light beams having orthogonal vibration planes to pass through and reflects the other; and
the photodetector is provided on a reflection optical path which is formed when the reflection of the servo light from the servo layer is incident on the second polarizing beam splitter, the servo light being incident on the servo layer after passing through the second polarizing beam splitter.

11. The holographic recording medium according to claim 1, wherein: the servo layer is composed of a photosensitive material having a refractive index modulated by light irradiation; and the incident angle selectivity is imparted to the servo layer by setting a maximum refractive index modulation factor of the photosensitive material to 0.005 or more and 0.01 or less and a thickness of the servo layer to 5 μm or more and less than 20 μm.

12. The holographic recording medium according to claim 1, wherein: the servo layer is composed of a photosensitive material having a refractive index modulated by light irradiation; and the wavelength selectivity is imparted to the servo layer by setting a maximum refractive index modulation factor of the photosensitive material to 0.0008 or more and 0.005 or less and a thickness of the servo layer to 20 μm or more and 100 μm or less.

13. A holographic recording medium comprising:
a recording layer having an interference pattern recorded thereon using object light and reference light emitted from a laser light source; and
a servo layer formed above the recording layer so as to face a direction of incident light, the servo layer having one of wavelength selectivity and incident angle selectivity, each of the wavelength selectivity and the incident angle selectivity allowing the object light and the reference light to pass through the servo layer before incident onto the recording layer,
wherein the servo layer reflects servo light having a wavelength different from a wavelength of the object light and a wavelength of the reference light or the servo layer reflects servo light having an incident angle different from an incident angle of the object light and an incident angle of the reference light,
one of servo information and address information is recorded on the servo layer, and
the servo layer is formed of a diffraction grating having a multilayer spheric shape and a constant grating space.

14. The holographic recording medium according to claim 13, wherein: the servo layer is composed of a photosensitive material having a refractive index modulated by light irradiation; and the incident angle selectivity is imparted to the servo layer by setting a maximum refractive index modulation factor of the photosensitive material to 0.005 or more and 0.01 or less and a thickness of the servo layer to 5 μm or more and less than 20 μm.

15. The holographic recording medium according to claim 13, wherein: the servo layer is composed of a photosensitive material having a refractive index modulated by light irradiation; and the wavelength selectivity is imparted to the servo layer by setting a maximum refractive index modulation factor of the photosensitive material to 0.0008 or more and 0.005 or less and a thickness of the servo layer to 20 μm or more and 100 μm or less.

16. A holographic recording-reproducing optical system, comprising:
the holographic recording medium according to claim 13;
a servo optical system including a beam splitter that branches off a portion of light to form servo light incident on the holographic recording medium at nearly right angles to the servo layer;
a polarizing beam splitter which splits the light branched off in a direction different from that of the servo light by the beam splitter into two linearly polarized light beams having orthogonal vibration planes;
a reference optical system which allows one of the linearly polarized light beams split by the polarizing beam splitter to be incident on the holographic recording medium as reference light from a direction different from that of the servo light;
an object optical system which allows the other of the linearly polarized light beams split by the polarizing beam splitter to be incident on the holographic recording medium as object light from a direction different from that of the servo light and the reference light; and
a photodetector which detects the reflection of the servo light from the servo layer, wherein:
the reference optical system comprises, in order from a polarizing beam splitter side, a ½ wave plate and a Fourier lens;
the object optical system comprises, in order from the polarizing beam splitter side, a spatial light modulator for modulating the linearly polarized light beam according to information to be recorded and a Fourier lens;

the servo optical system comprises, in order from a beam splitter side, a second polarizing beam splitter, a ¼ wave plate, and a condensing lens;

the second polarizing beam splitter allows one of two linearly polarized light beams having orthogonal vibration planes to pass through and reflects the other; and the photodetector is provided on a reflection optical path which is formed when the reflection of the servo light from the servo layer is incident on the second polarizing beam splitter, the servo light being incident on the servo layer after passing through the second polarizing beam splitter.

17. A holographic recording-reproducing optical system, comprising:

a holographic recording medium including:

a recording layer having an interference pattern recorded thereon using object light and reference light emitted from a laser light source; and a servo layer formed above the recording layer so as to face a direction of incident light, the servo layer having one of wavelength selectivity and incident angle selectivity, each of the wavelength selectivity and the incident angle selectivity allowing the object light and the reference light to pass through the servo layer before incident onto the recording layer, wherein the servo layer reflects servo light having a wavelength different from a wavelength of the object light and a wavelength of the reference light or the servo layer reflects servo light having an incident angle different from an incident angle of the object light and an incident angle of the reference light, one of servo information and address information is recorded on the servo layer, and the servo layer is constituted by any of a phase type reflection hologram, a dielectric multilayer film, and a dichroic mirror;

the holographic recording-reproducing optical system further comprising:

a servo optical system including a beam splitter that branches off a portion of light to form servo light incident on the holographic recording medium at nearly right angles to the servo layer;

a polarizing beam splitter which splits the light branched off in a direction different from that of the servo light by the beam splitter into two linearly polarized light beams having orthogonal vibration planes;

a reference optical system which allows one of the linearly polarized light beams split by the polarizing beam splitter to be incident on the holographic recording medium as reference light from a direction different from that of the servo light;

an object optical system which allows the other of the linearly polarized light beams split by the polarizing beam splitter to be incident on the holographic recording medium as object light from a direction different from that of the servo light and the reference light; and a photodetector which detects the reflection of the servo light from the servo layer, wherein:

the reference optical system comprises, in order from a polarizing beam splitter side, a ½ wave plate and a Fourier lens;

the object optical system comprises, in order from the polarizing beam splitter side, a spatial light modulator for modulating the linearly polarized light beam according to information to be recorded and a Fourier lens;

the servo optical system comprises, in order from a beam splitter side, a second polarizing beam splitter, a ¼ wave plate, and a condensing lens;

the second polarizing beam splitter allows one of two linearly polarized light beams having orthogonal vibration planes to pass through and reflects the other; and the photodetector is provided on a reflection optical path which is formed when the reflection of the servo light from the servo layer is incident on the second polarizing beam splitter, the servo light being incident on the servo layer after passing through the second polarizing beam splitter.

* * * * *